Jan. 19, 1965     C. C. GRANGER     3,166,348
TOBACCO CURING APPARATUS
Filed March 5, 1963     2 Sheets-Sheet 1
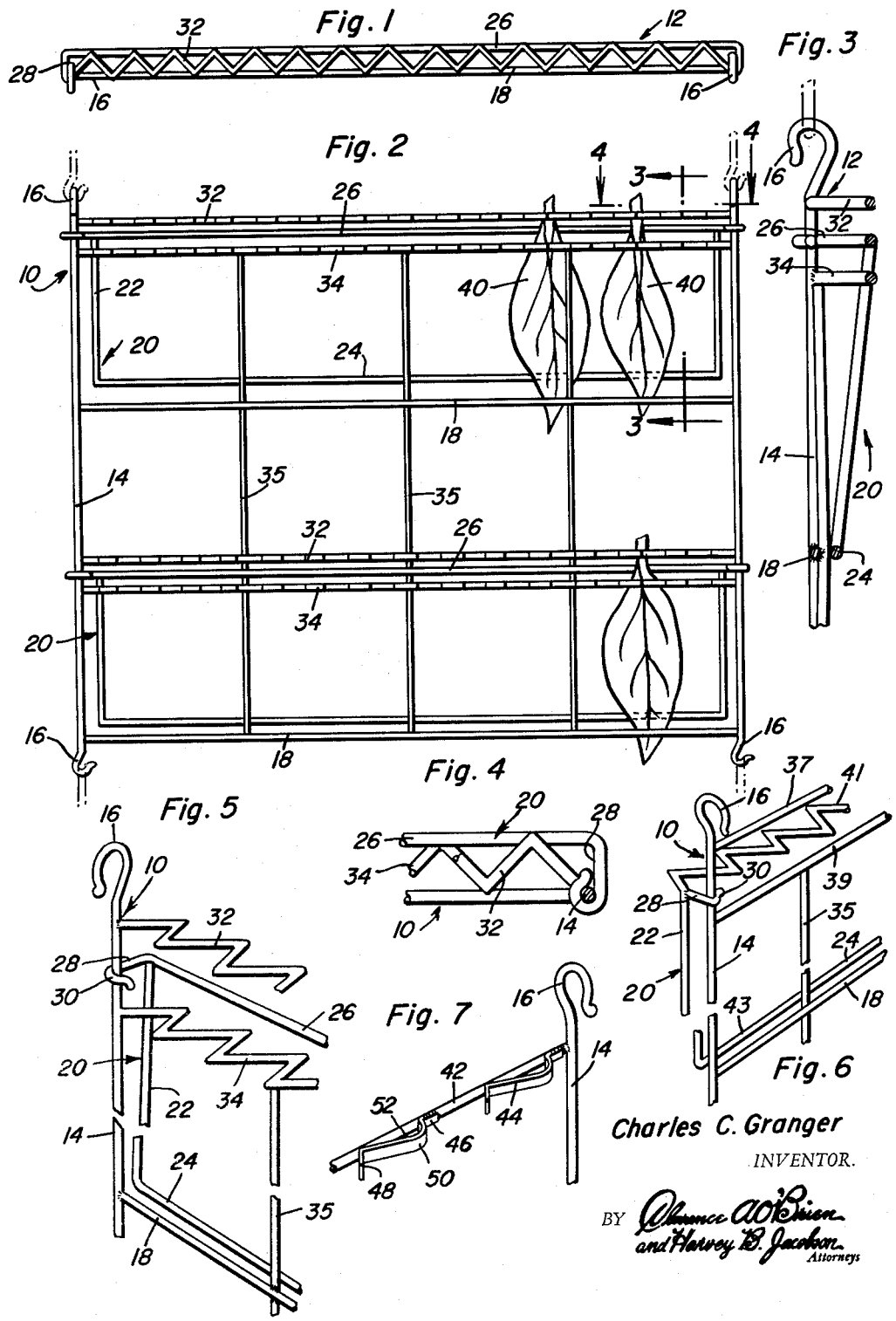
Charles C. Granger
INVENTOR.

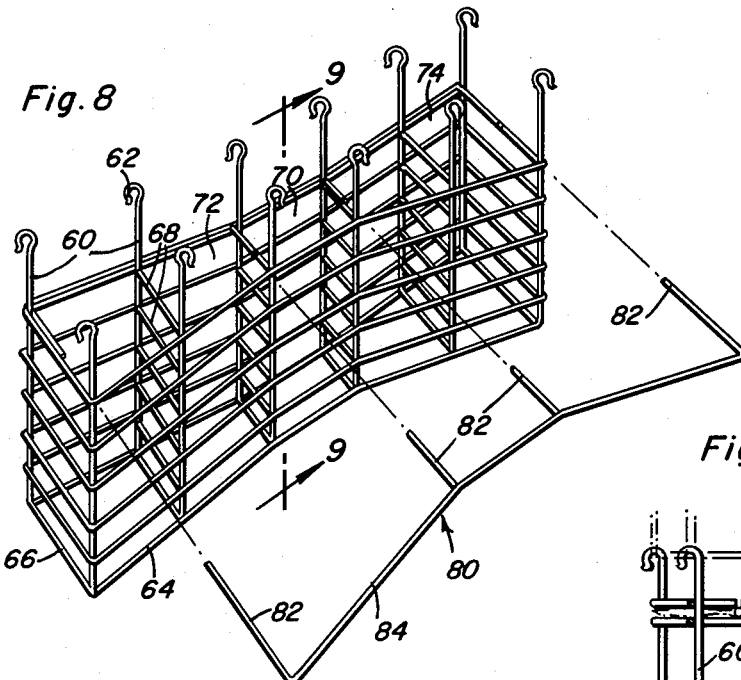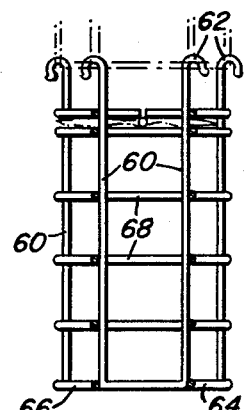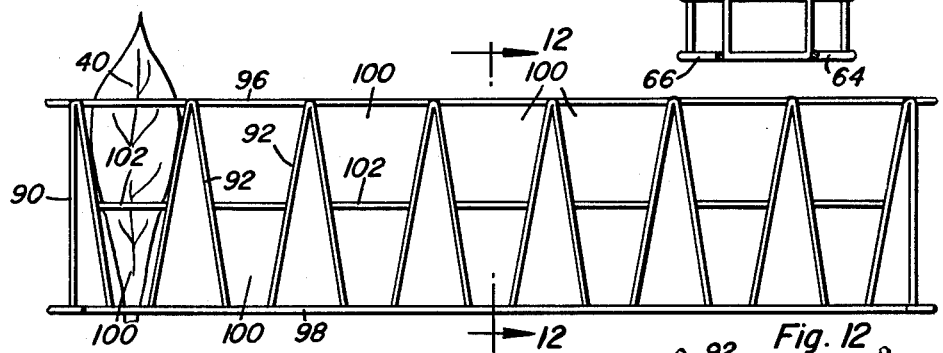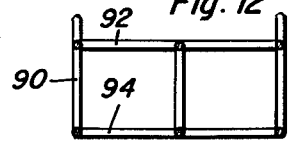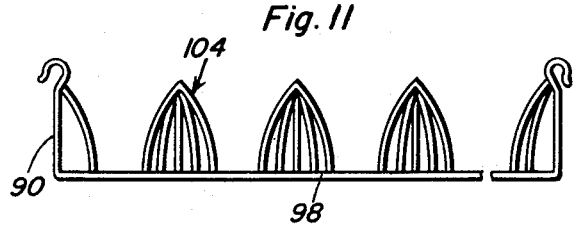

United States Patent Office 3,166,348
Patented Jan. 19, 1965

3,166,348
TOBACCO CURING APPARATUS
Charles C. Granger, 1203 Chestnut St., Henderson, N.C.
Filed Mar. 5, 1963, Ser. No. 262,867
6 Claims. (Cl. 294—5.5)

This invention comprises a novel and useful tobacco curing apparatus and more particularly pertains to a wire or rod-like receptacle, frame or stick for securely holding tobacco leaves while affording free access of curing air thereto during a curing operation.

In the curing and seasoning of tobacco leaves after they have been gathered from the field, it is customary to stack or secure the leaves upon sticks or baskets of various character while subjecting them to the flow of curing air or gases. However, the difficulty of obtaining complete and uniform access of the curing medium to each of the leaves owing to the closeness of confinement of the leaves which exposes unequal surface areas thereof for contact by the curing medium detrimentally affects the curing operation both as to the length of time required and as to the efficiency or the effectiveness of the curing operation.

It is therefore the primary object of this invention to provide a means which will greatly facilitate and render more effective the curing operation by retaining the leaves in a relatively better spaced relation with respect to each other to afford more complete access of the curing medium thereto.

A further object of the invention is to provide a curing basket construction which will enable the baskets to be connected to each other either vertically or horizontally in an improved manner thereby greatly increasing the storage capacity of a curing barn and facilitating the placing or removing of the baskets in the curing barn.

A further object of the invention is to provide a metallic tobacco leaf frame or stick having a greatly improved leaf clipping action which will not only facilitate the placing of the leaves therein or the removal of the leaves therefrom but will hold the leaves securely and in a relatively spaced condition for more effective treatment by the curing medium.

Still another purpose of the invention is to provide a tobacco curing apparatus having leaf orientating and retaining means therein which will enable the leaves to be disposed in spaced relation in vertical stacks and with the stacks being spaced from each other sufficiently to provide for the ready flow of curing gases therebetween.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a preferred form of tobacco stick to be used with the invention;

FIGURE 2 is an elevational view of a basket or receptacle showing the sticks of FIGURE 1 mounted thereon;

FIGURE 3 is an enlarged view in vertical transverse section, taken substantially upon the plane indicated by the section line 3—3 of FIGURE 2;

FIGURE 4 is an enlarged view taken in horizontal section substantially upon the plane of the section line 4—4 of FIGURE 2;

FIGURE 5 is a detail perspective of the upper left portion of FIGURE 2;

FIGURE 6 is a perspective detail view, similar to FIGURE 5 but of another modified form of the tobacco stick of FIGURE 1;

FIGURE 7 is a fragmentary perspective view of a modified tobacco stick which may be used in place of that of FIGURE 1;

FIGURE 8 is an exploded perspective view of a modified form of tobacco receptacle or basket of the invention;

FIGURE 9 is a vertical sectional view taken substantially upon the plane indicated by the section line 9—9 of FIGURE 8;

FIGURE 10 is a top plan view of another modified basket;

FIGURE 11 is a front elevational view of FIGURE 10 parts being broken away; and

FIGURE 12 is a view in vertical transverse section upon a reduced scale substantially upon the section line 12—12 of FIGURE 10.

Reference is now made first to the form of the invention shown in FIGURES 1–5. In this arrangement there is shown a receptacle, basket or frame indicated generally by the numeral 10 and which is of a wire-like configuration adapted to releasably receive and retain a plurality of racks or sticks 12 therein. As will be apparent from FIGURES 2 and 3, the frame 10 is preferably of a rectangular configuration consisting of a pair of vertical rods 14 whose upper and lower ends terminate in hooks or eyes as at 16 which are adapted to engage corresponding hooks or eyes on adjacent baskets to enable a plurality of the baskets to be disposed in an attached vertically or horizontally extending string.

In addition to the vertical members 14, the baskets 10 include rigidly connected horizontally extending transverse bars 18 therebetween which divide the area of the receptacle 10 into rectangular portions.

A removable rectangular section or frame indicated generally by the numeral 20 is mounted between the vertical side members 14 and above each of the crossbars 18 as shown in FIGURE 2. The section 20 includes a pair of vertical rods 22 which at their bottom are integrally connected by a horizontal rod 24. At their upper ends, the vertical rods are secured to a top rod 26 having a laterally projecting terminal portion 28 provided with the hooked extremity 30 thereon. The portions 30 and 20 have sufficient resiliency inherent therein to enable them to be swung apart whereby they may be snapped about the vertical rods 14 of the basket as suggested and shown in FIGURE 5.

Fixedly secured to the vertical rods 14 are upper and lower sets of stationary members. Each set consists of an upper member 32 together with a lower member 34 spaced above and below the horizontal top member 26 of the section 20. The members 32 and 34 are given a sawtoothed or staggered configuration as shown clearly in FIGURES 1, 4 and 5.

A plurality of vertical elements 35, see FIGURES 1 and 5 are connected fixedly to the transverse bars 18 and to the uppermost lower member 34 in spaced relation therealong to thus effect a grid-like structure of the member 10. Obviously, any desired spacing of the elements 35 and additional transverse members connected thereto may be employed to obtain a screen of any desired mesh size for securing tobacco leaves thereagainst.

In employing this construction to store tobacco leaves, the tobacco leaves 40 are suspended in an inverted position with their stems upward and clamped between the top bar 26 of the sections 20 and the adjacent upper and lower sawtoothed members 32 and 34 of the basket 10. The resilience of the engagement of the hooked extremity 30 of the member 26 serves to frictionally grip the stems of the leaves between this member and the two sawtoothed members 32 and 34 whereby the leaves are securely retained in place in a spaced relation to each other.

As will be observed from FIGURE 2, the sections 20 are spaced sufficiently vertically from each other to ensure of an adequate flow of the curing medium between the vertically spaced rows of leaves as well as between the individual leaves of each row.

A simpler and modified construction of the basket and frame from that of FIGURES 1–5 is disclosed in FIGURE 6. There is employed, with certain minor exceptions as set forth hereinafter, the same stationary frame 10, with swingable and removable sections 20 attached thereto in the same manner previously described. The same reference numerals designate the elements of this embodiment which are identical with those of FIGURES 1–5.

However, in place of the pairs of toothed clamping bars 32, 34, there are provided pairs of straight transverse clamping bars 37, 39. Instead of the straight holding bars 24, 26 the section 20 have upper and lower holding bars 41 and 43, each or both of which may be of sawtoothed configuration. For convenience of illustration only, the upper bar 41 is depicted as being sawtoothed. This form of the invention is used in the same manner as that of FIGURES 1–5.

In both of the forms of FIGURES 1–5 and FIGURE 6, the saw-toothed bars having their teeth, points or apices of proper configuration and size to penetrate and hold tobacco leaves, the latter being held between the associated clamping bars of the frame and the holding bars of the sections.

In lieu of the sawtoothed clamping bars 32, 34 and 41, 43 in the arrangements of FIGURES 1–6, a modified construction may be employed as shown in FIGURE 7. For this purpose, the vertical members 14 of the frame having the hooked extremity 16 have the previously described hinged sections 20 and the sawtooth bars 32 and 34 of FIGURES 1–5 and 41 of FIGURE 6 omitted therefrom. In place thereof there is provided a series of cross straps as at 42 which are terminally connected and rigidly secured to the vertical members 14. Each of the straps 42 has a spring clip 44 thereon which spring clip has one end as at 46 fixedly secured to the strap 42 as by welding while its other end 48 is urged against the strap 42 by the resilient action inherent in the bowed section 50 of the clip. In this form of the invention, the upwardly extending stem of a tobacco leaf 40 is fitted to the clip by being pressed between the angulated extremity thereof and the member 42 until it moves into the central or bowed section 50 between the clip and the strap 42 where it is frictionally gripped and retained.

In either of the forms of the invention it will apparent that a plurality of vertically spaced horizontally extending rows of tobacco leaves are frictionally gripped and held in a side-by-side but spaced relation in the basket or receptacle 10. The receptacle as suggested in dotted lines in FIGURE 2 may be connected in vetrically extending strings so as to extend from the roof of a barn toward the floor thereof. Alternatively, the successively connected baskets 10 may be secured together in horizontally extending strings from side to side of a barn, with the strings being disposed in vertically spaced relation with respect to each other. In either event, each string may be made as long as desired by merely applying additional baskets 10 thereto.

A modified construction of a basket is shown in FIGURES 8 and 9. In this form of the invention there is provided a wire-like or rod-like receptacle. Receptacles consist of a plurality of vertical members each indicated by the numeral 60 and each having the hook 62 at its upper end. If desired, corresponding hooks may be provided at its lower end to enable a series of these receptacles to be secured to each other.

Each receptacle further consists of a plurality of horizontally extending wire or rod elements forming sides 64 and ends 66. Transverse elements as at 68 extend between the side members at convenient distances therealong to thus divide the volume within the sides and end members of the receptacle into longitudinally spaced vertical compartments. As will be noted, each compartment consists of a quadrilateral-shaped frame having side and end walls with each such frame being spaced vertically from the adjacent frame in the same tier.

As shown in FIGURE 8, it is preferred to form the innermost compartment such as that indicated at 70 of a minimum width, while the successive outer compartments as at 72 and 74 are formed of increasing width.

In using this form of the invention tobacco leaves are disposed in each of the compartments 72 or 74, the leaf resting across the horizontal members therein. An intermediate compartment such as the compartment 70 thus forms an unobstructed air flue through the basket allowing the curing air to circulate between the stacks of tobacco leaves retained therein.

In order to secure the leaves firmly in their individual compartments, retaining members in the form of weighted clips indicated generally by the numeral 80 are utilized, there being two such clips for each of the vertically spaced rows of compartments. Each clip has laterally projecting arms 82 which are joined to a longitudinal arm 84. Two such clips are provided for each row of compartments and the arms 82 are disposed inwardly from the side walls of the compartments to overlie and rest upon and retain the tobacco leaves within the compartments.

A still further form of the invention is illustrated in FIGURES 10–12. In the tobacco leaf basket of these figures the vertical posts or members are shown at 90 and are connected together by upper and lower transverse rods 92 and 94. Longitudinally extending upper and lower rods are shown at 96 and 98. As will be seen by a comparison of FIGURE 9 with FIGURE 11, the transverse rods 92 are staggered or inclined with respect to each other so as to provide tapering compartments or receptacles 100 between each pair of rods. The tapering crossrods 92 are connected together by cross members as at 102.

The tobacco leaves 40 are disposed horizontally in the basket with the leaves extending between the side walls 92 of each compartment. As shown in FIGURE 11, the transverse bars 92 from the top to the bottom of the basket may be curved or tapered as indicated at 104 to thereby facilitate the dropping of the leaves into the space between the space or compartments between the side walls 92.

As in the preceding form of the invention, a series of baskets may be strung together either vertically or horizontally.

It will thus be apparent that there has been provided a tobacco leaf retaining and storing means whereby the leaves may be securely retained in a sufficiently spaced relation to effectively cure the leaf by treating it to the curing medium in the barn.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tobacco leaf curing apparatus comprising a generally rectangular frame having connected vertical side members and horizontal and upper and lower members, a hinged rectangular section pivoted to one vertical side member and having a hook for resiliently engaging the other vertical side member, said hinged section having upper and lower crossbars, said frame having a pair of horizontal vertically spaced bars fixedly secured to said vertical side members and cooperating with said hinged section upper crossbar for clamping tobacco leaves therebetween.

2. The tobacco leaf curing apparatus of claim 1 including hooks at the lower and upper extremities of said vertical members whereby adjacent frames may be connected together in a continuous string.

3. The tobacco leaf curing apparatus of claim 1 wherein said frame's vertically spaced bars are saw-toothed.

4. The tobacco leaf curing apparatus of claim 1 wherein said frame's horizontal vertically spaced bars are saw-toothed and are disposed above and below the associated hinged section top bar.

5. A tobacco leaf curing apparatus comprising a frame and a section hingedly mounted on said frame and movable into juxtaposition with said frame for clamping tobacco leaves therebetween, said frame comprising a pair of vertical side members together with vertically spaced horizontal members each fixedly secured to both side members, said section being horizontally elongated and generally rectangular and having rigidly joined vertical ends and upper and lower cross members comprising holding bars, said frame including a vertically spaced pair of horizontal clamping bars extending between said side members and disposed in vertically spaced relation above and below one of said section holding bars, at least one of said clamping and holding bars being saw-toothed.

6. The tobacco leaf curing apparatus of claim 5 wherein said frame is of grid-like construction having a plurality of vertical elements disposed in horizontally spaced relation therealong, each element fixedly secured to said horizontal members and to the lowermost of said horizontal clamping bars.

References Cited in the file of this patent

UNITED STATES PATENTS

| | | |
|---|---|---|
| 476,353 | Allred | June 7, 1892 |
| 713,101 | Hosford | Nov. 11, 1902 |
| 921,694 | Hall | May 18, 1909 |
| 934,905 | Foster | Sept. 21, 1909 |
| 1,263,144 | Styers | Apr. 16, 1918 |
| 1,278,689 | Lathrop | Sept. 10, 1918 |
| 1,416,758 | Silverman | May 23, 1922 |
| 1,936,164 | Jarris | Nov. 21, 1933 |
| 2,163,865 | Bitney | June 27, 1939 |
| 2,567,503 | Arsenault | Sept. 11, 1951 |
| 2,585,360 | Williams | Feb. 12, 1952 |
| 2,846,941 | Goodwin | Aug. 12, 1958 |
| 2,983,218 | Persinger et al. | May 9, 1961 |
| 3,056,621 | Edridge | Oct. 2, 1962 |

FOREIGN PATENTS

| | | |
|---|---|---|
| 1,262,869 | France | Apr. 24, 1961 |